United States Patent
Cheng et al.

(10) Patent No.: US 7,370,992 B2
(45) Date of Patent: May 13, 2008

(54) PROJECTOR

(75) Inventors: Chu-Ming Cheng, Hsinchu (TW); Chi-Chui Yun, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 195 days.

(21) Appl. No.: 11/315,258

(22) Filed: Dec. 23, 2005

(65) Prior Publication Data
US 2006/0158898 A1  Jul. 20, 2006

(30) Foreign Application Priority Data
Jan. 18, 2005  (TW) .............................. 94101397 A

(51) Int. Cl.
*F21V 9/00* (2006.01)
(52) U.S. Cl. ...................... 362/293; 362/583; 362/551; 362/268; 362/282
(58) Field of Classification Search ............... 362/294, 362/583, 293, 510, 2, 558, 253, 551, 268, 362/277, 282–284, 319, 322, 324; 353/55, 353/84, 9; 359/891, 859; 385/901
See application file for complete search history.

(56) References Cited

U.S. PATENT DOCUMENTS

| 7,006,310 B2* | 2/2006 | Karube et al. .............. 359/891 |
| 7,172,326 B2* | 2/2007 | Saccomanno ............... 362/583 |
| 2005/0265027 A1* | 12/2005 | Wu et al. ................... 362/293 |

* cited by examiner

*Primary Examiner*—Bao Q Truong
(74) *Attorney, Agent, or Firm*—Birch, Stewart, Kolasch & Birch, LLP

(57) ABSTRACT

A projector comprises a light source, an Ultraviolet/Infrared Radiation (UV/IR) filter, a color wheel and means for guiding the light beam reflected by the color wheel toward directions away from the light source. The light source is for providing a light beam. The UV/IR filter is disposed with a tilt angle ranging from 13 degrees to 30 degrees. The color wheel for receiving the light beam transmits a primary color light beam of the light beam in a predetermined time section, and the other color light beam of the light beam is reflected by the color wheel. The means for guiding the light beam reflected by the color wheel toward directions away from the light source further guide a invisible light beam of the light beam reflected from the UV/IR filter.

14 Claims, 6 Drawing Sheets

PROJECTOR

BACKGROUND OF THE INVENTION (1) Field of the Invention

The present invention generally relates to a projector, and particularly relates to a projector for reducing a temperature of a light source.

(2) Description of the Prior Art

Please refer to FIG. 1A, which is illustrating a conventional projector 2. The conventional projector 2 comprises a light source 4, an Ultraviolet/Infrared Radiation (UV/IR) filter 6, a color wheel 8, an integration rod 10, a light valve 12, and a projection lens 14.

Please refer to FIG. 1B, which is illustrating a light path of the conventional projector according to FIG. 1A. The light source 4 comprises a lamp 402 for providing a light beam and a lamp reflector 404. The lamp reflector 404 guides the light beam toward the UV/IR filter 6. The UV/IR filter 6 transmits a visible light beam of the light beam and reflects an ultraviolet (UV) and an infrared radiation (IR) of the light beam.

The visible light beam-passes through the UV/IR filter 6 and the color wheel 8. The color wheel 8 comprises different filters for several primary colors, such as red, green and blue. While the color wheel 8 rotates, a primary color light beam of the light beam passes through the color wheel 8 in a predetermined time section, and the other color light beam of the light beam is reflected by the color wheel 8.

Following, the primary color light beam passing through the color wheel 8 passes through the integration rod 10 for uniforming the light beam to project on the light valve 12. After modulated by the light valve 12, the primary color light beam passes through the projection lens 14 to display images on a screen.

A weighty issue of the projector is a heat from the light source 4. The UV and IR reflected from the UV/IR filter 6, and the visible light beam reflected from the color wheel 8 are reflected back to the light source 4 so as to raise a temperature of the light source 4. This high temperature causes a damage on the light source 4 and harms the display performance of the projector 2.

SUMMARY OF THE INVENTION

An objective of the present invention is to provide a projector, which is capable of preventing an invisible light beam and a visible light beam back to a light source of the projector to protect the light source from damages causing from high temperature and maintain a display performance of the projector.

The present projector comprises a light source, an Ultraviolet/Infrared Radiation (UV/IR) filter, a color wheel and means for guiding the light beam reflected by the color wheel toward directions away from the light source. The light source is for providing a light beam. The UV/IR filter is disposed with a tilt angle ranging from 13 degrees to 30 degrees. The color wheel for receiving the light beam transmits a primary color light beam of the light beam in a predetermined time section, and reflects the other color light beam of the light beam. The means for guiding the light beam reflected by the color wheel toward directions away from the light source further guide a invisible light beam of the light beam reflected from the UV/IR filter toward directions away from the light source.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention is specified with reference to preferred embodiment illustrated in the drawings, in which.

DESCRIPTION OF THE PREFERRED EMBODIMENT

The present invention will become more fully understood from the detailed description given hereinbelow and the accompanying drawings which are given by way of illustration only, and thus are not limitative of the present invention.

Figure 1A:
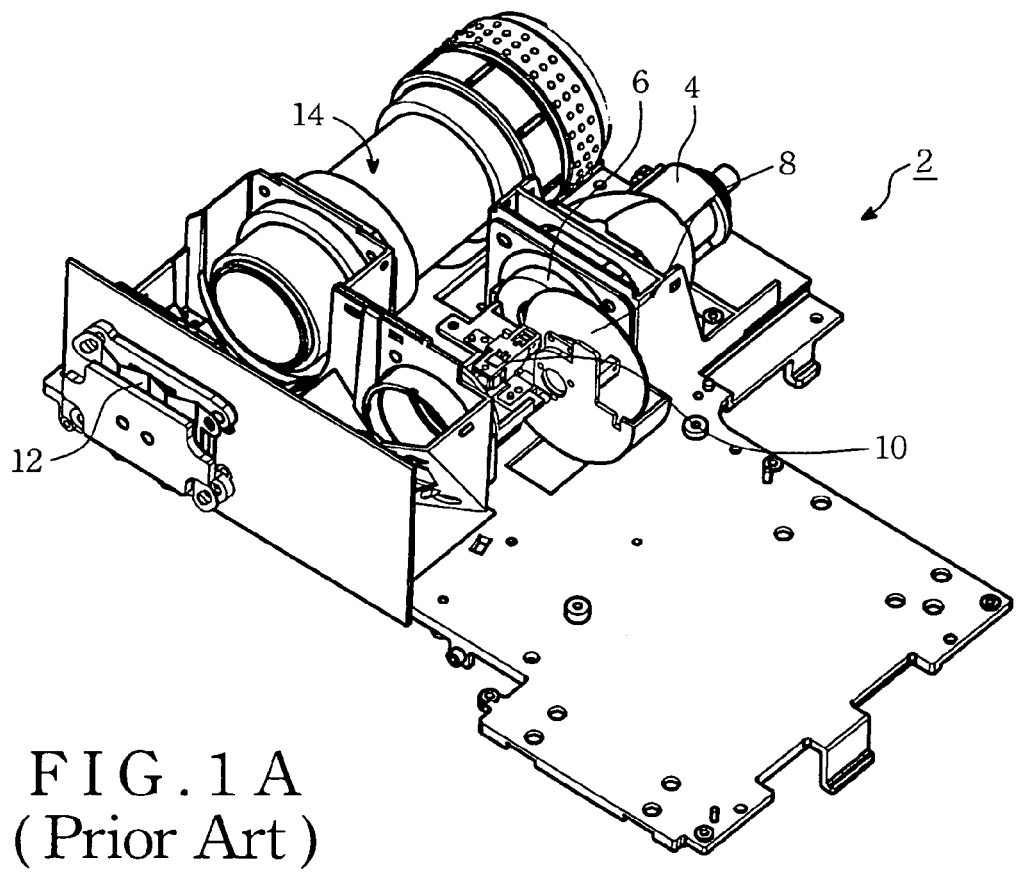
FIG. 1A illustrates a conventional projector.
Figure 1B:
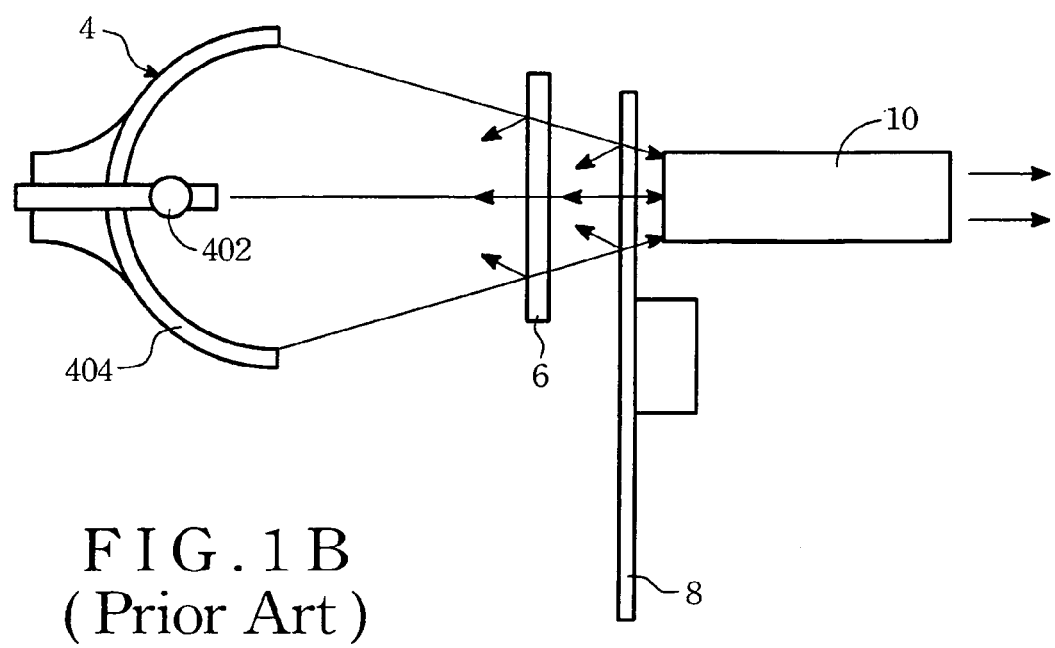
FIG. 1B illustrates a light path of the conventional projector according to FIG. 1A.
Figure 2:
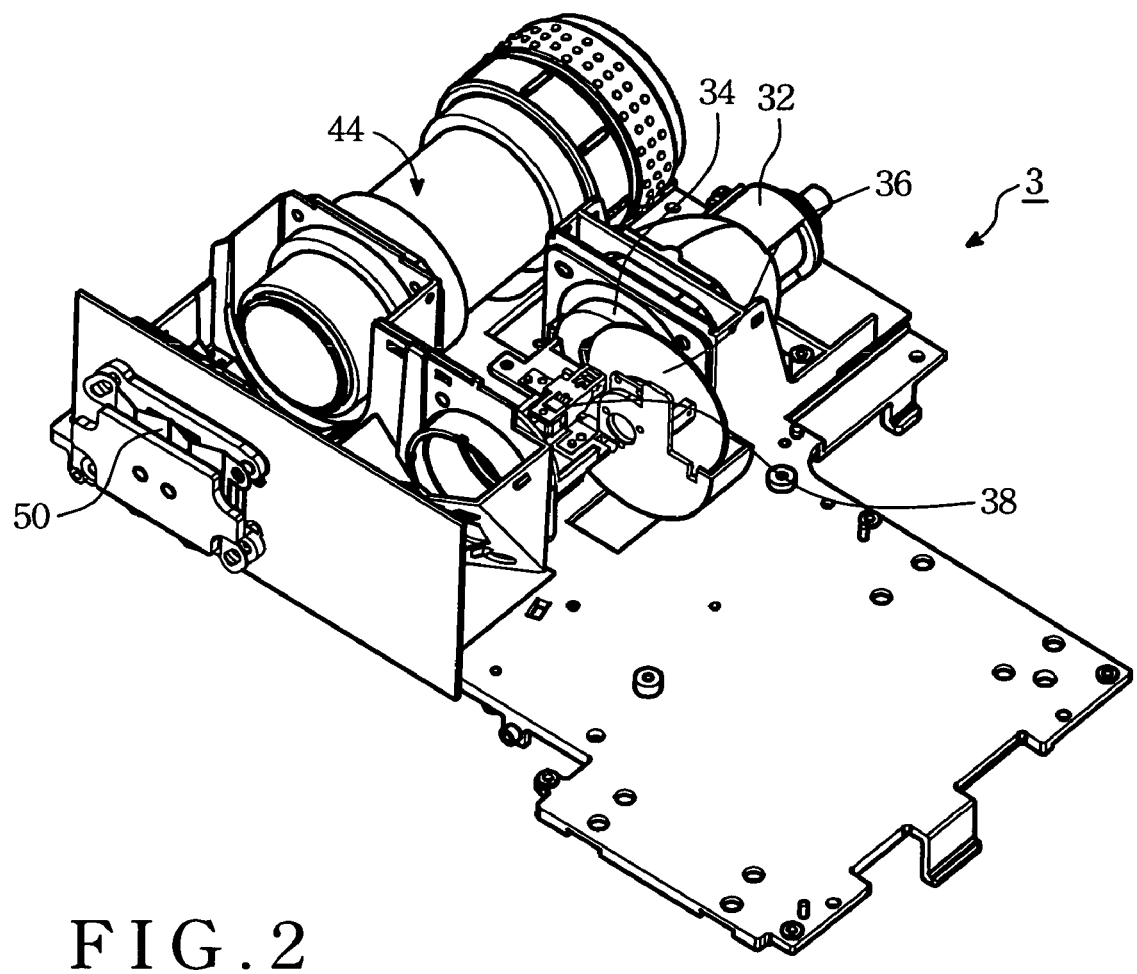
FIG. 2 illustrates a projector according to the present invention.

Please refer to FIG. 2, which illustrates a projector 3 according to the present invention. The projector 3 comprises a light source 32, an Ultraviolet/Infrared Radiation (UV/IR) filter 34, a color wheel 36, an integration rod 38, a light valve 50, and a projection lens 44.

Figure 3:
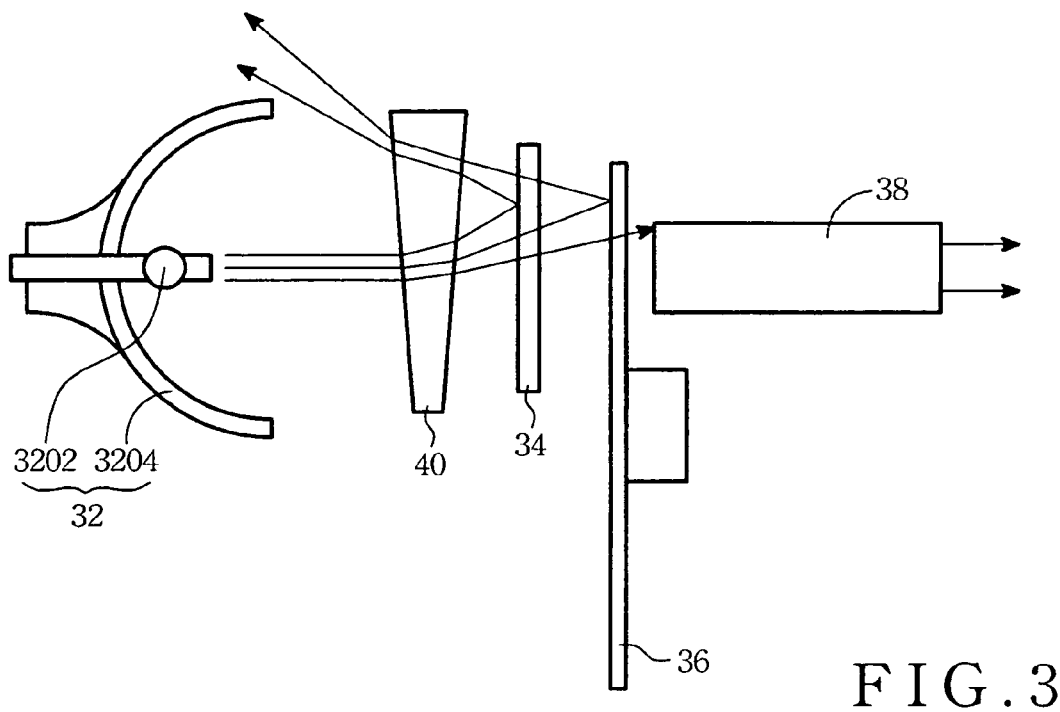
FIG. 3 illustrates a light path of a projector according to the present invention of the first embodiment.

Please refer to FIG. 3. The light source 32 comprises a lamp 3202 and a lamp reflector 3204. The lamp 3202 provides a light beam. The lamp reflector 3204 guides the light beam provided by the lamp 3202 to the color wheel 36.

The UV/IR filter 34 is disposed between the light source 32 and the color wheel 36 in this embodiment. The UV/IR filter 34 transmits a visible light beam of the light beam and reflects an invisible light beam of the light beam. The invisible light beam-includes the ultraviolet (UV) and the infrared radiation (IR).

The color wheel 36 is disposed on a light path of the light beam from the light source 32 for receiving the light beam. In this embodiment, the color wheel 36 receives and filters the visible light beam passing through the UV/IR filter 34. The color wheel 36 comprises different filters for several primary colors, such as red, green and blue. While the color wheel 36 rotates, it transmits the visible light beam into a plurality of primary color light beam in sequence. In a predetermined time section, a primary color light beam corresponding to one kind of the filters, such as a red filter, a blue filter or a green filter, is able to transmit the color wheel 36, and the other primary color light beam is reflected by the color wheel 36.

The integration rod 38 is disposed adjacent to the color wheel 36 for receiving and uniforming the primary color light beam from the color wheel 36. The primary color light beam passing through the integration rod 38 is projected on the light valve 50. After modulated by the light valve 50, the primary color light beam is transmitted through the projection lens 44 to display images on a screen.

Following, the present invention provides several embodiments to explain how to resolve the mentioned problems about the high temperature of the conventional projector.

Please refer to FIG. 3. The projector 3 further comprises a transparent wedge-shaped structure 40 for guiding the light beam reflected by the color wheel 36 toward directions away from the light source 32. The transparent wedge-shaped structure 40 is disposed between the light source 32 and the color wheel 36 and refracts the light beam reflected from the color wheel 36 to directions away from the light source 32. Similarly, the transparent wedge-shaped structure 40 is disposed between the UV/IR filter 34 and the light source 32 and refracts the invisible light beam reflected from the UV/IR filter 34 to directions away from the light source 32.

Figure 4:
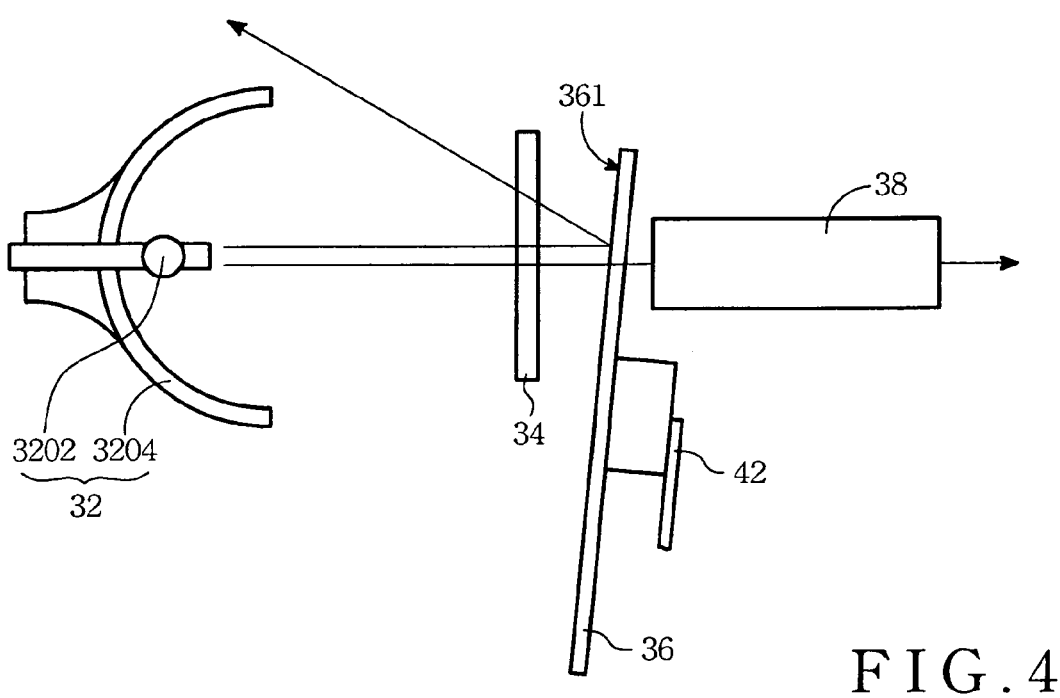
FIG. 4 illustrates a light path of a projector according to the present invention of the second embodiment.

Please refer to FIG. 4. The projector 3 further comprises a tilt structure 42. The tilt structure 42 coupled with the color wheel 36 forms a first tilt surface 361. Because of the first tilt surface 361, the light beam reflected from the color wheel 36 is reflected toward directions away from the light source 32.

Figure 5:
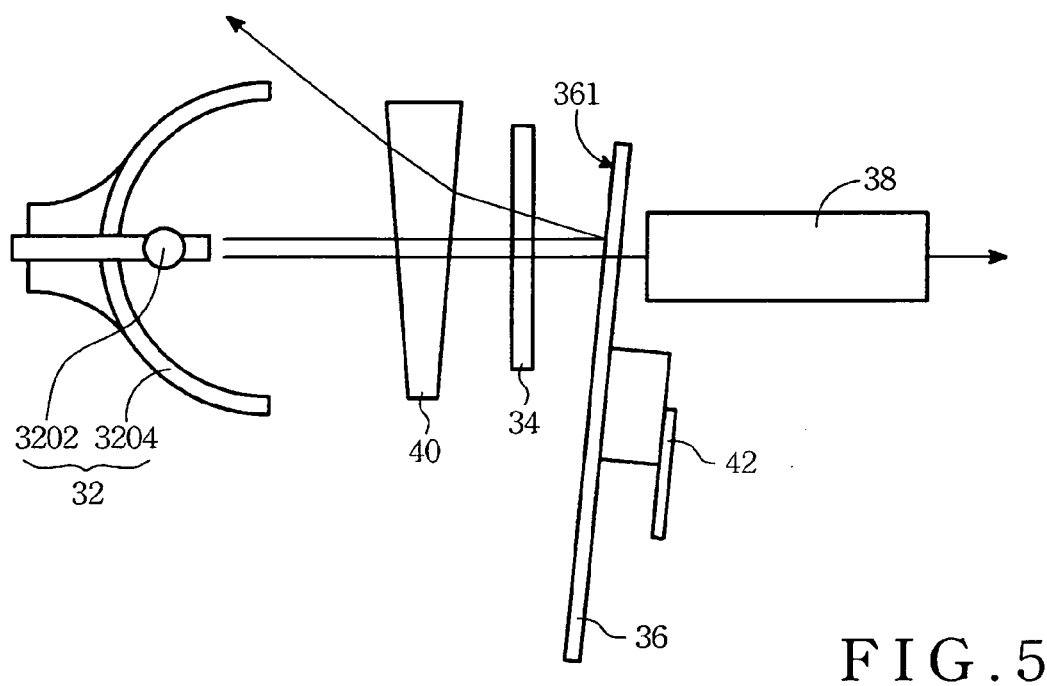
FIG. 5 illustrates a light path of a projector according to the present invention of the third embodiment.

Please refer to FIG. 5. The transparent wedge-shaped structure 40 and the tilt structure 42 operate in coordination for, guiding the light beam reflected by the color wheel 36 toward directions away from the light source 32 in this embodiment. Considering that the disposed position of the color wheel 36 and the integration rod 38 is very close, a tilt level of the first tilt surface 361 is therefore extremely limited. Employing both of the transparent wedge-shaped structure 40 and the first tilt surface 361 can guide the light beam reflected from the color wheel 36 and UV/IR filter 34 toward directions away from the light source 32 more effectively.

Figure 6:
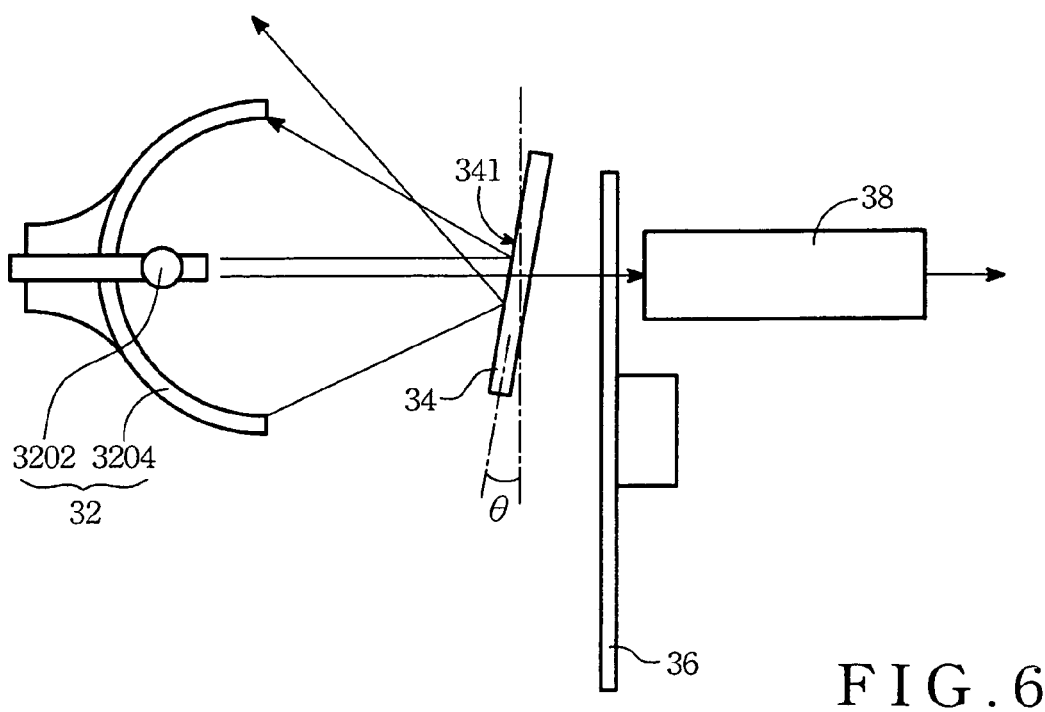
FIG. 6 illustrates a light path of a projector according to the present invention of the fourth embodiment.

Please refer to FIG. 6. In this embodiment, the UV/IR filter 34 is disposed with a tilt angle θ to have a second tilt surface 341 to reflect the invisible light beam toward directions away from the light source 32. Preferably, the tilt angle θ ranges from 13 degrees to 30 degrees.

Figure 7:
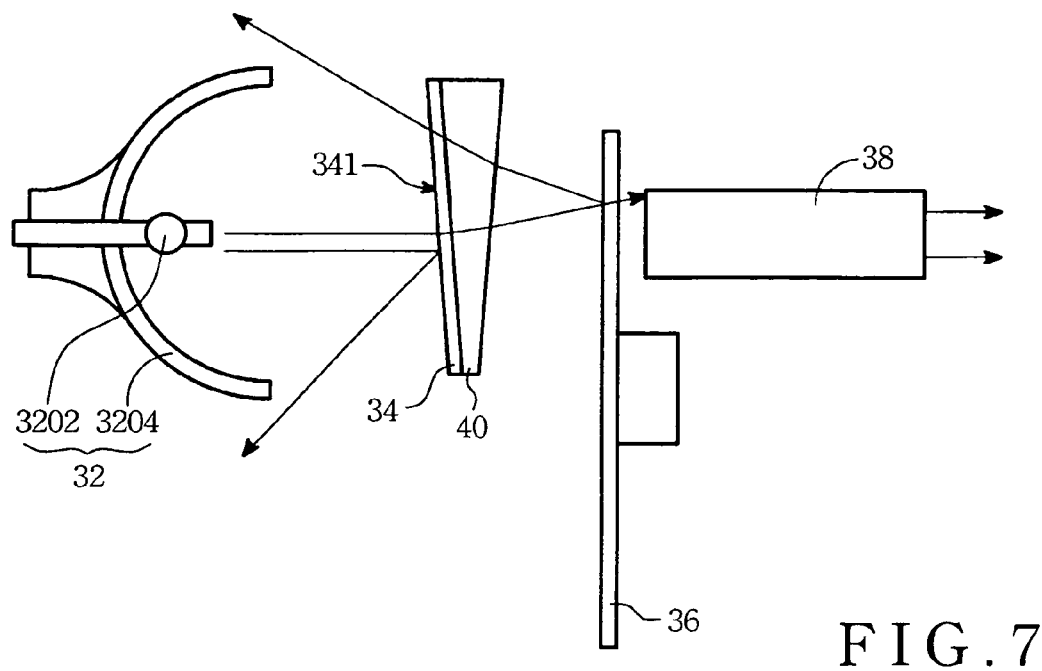
FIG. 7 illustrates a light path of a projector according to the present invention of the fifth embodiment.

Please refer to FIG. 7. In this embodiment, the transparent wedge-shaped structure 40 is disposed between the color wheel 36 and the light source 32, and the UV/IR filter 34 is disposed on a surface of the transparent wedge-shaped structure 40. Therefore, the UV/IR filter 34 has the second tilt surface 341 to reflect the invisible light beam toward directions away from the light source 32. The light beam reflected by the color wheel 36 is refracted by the transparent wedge-shaped structure 40 toward directions away from the light source 32. In addition, in the embodiment, coating methods can be directly applied on the surface of the transparent wedge-shaped structure 40 to form the UV/IR filter 34. As a result, the present invention is able to be fabricated with a much more simplified and convenient process.

Figure 8:
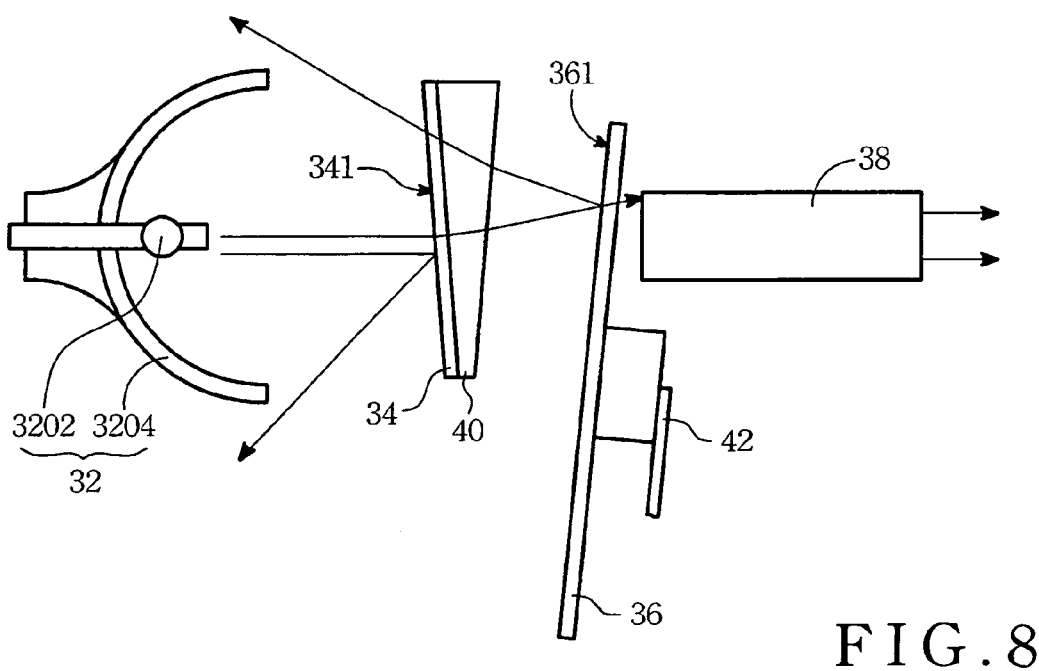
FIG. 8 illustrates a light path of a projector according to the present invention of the sixth embodiment.

Please refer to FIG. 8. In this embodiment, the color wheel 36 is coupled with the tilt structure 42 to form the first tilt surface 361. Furthermore, the UV/IR filter 34 is disposed on the surface of the transparent wedge-shaped structure 40, which is adjacent to the light source 32, to form the second tilt surface 341. In this embodiment, the transparent wedge-shaped structure 40 cooperated with the first tilt surface 361 is capable of guiding the light beam reflected from the color wheel 36 toward directions away from the light source 32. The second tilt surface 341 is capable of reflecting the invisible light beam toward directions away from the light source 32.

Figure 9:
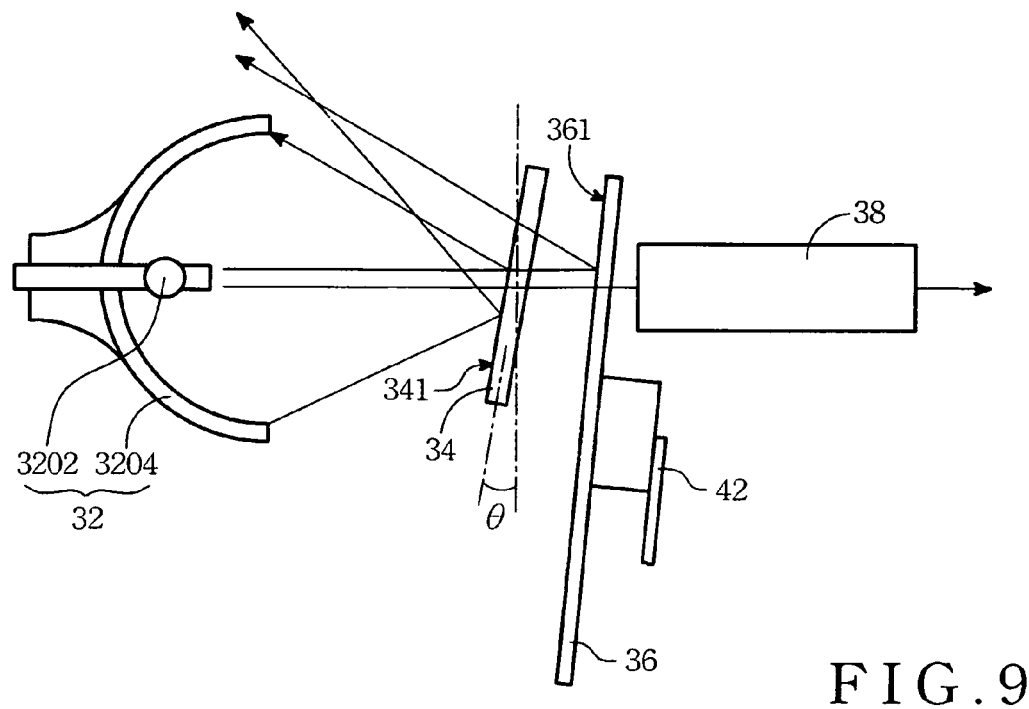
FIG. 9 illustrates a light path of a projector according to the present invention of the seventh embodiment.

Please refer to FIG. 9. This embodiment is a combination of embodiments according to FIG. 4 and FIG. 6. UV/IR filter 34 is disposed with a tilt angle θ to have the second tilt surface 341 to reflect the invisible light beam toward directions away from the light source 32. The color wheel 36 coupled with the tilt structure 42 has the first tilt surface 361 to reflect the light beam reflected form the color wheel 36 toward directions away from the light source 32.

Figure 10:
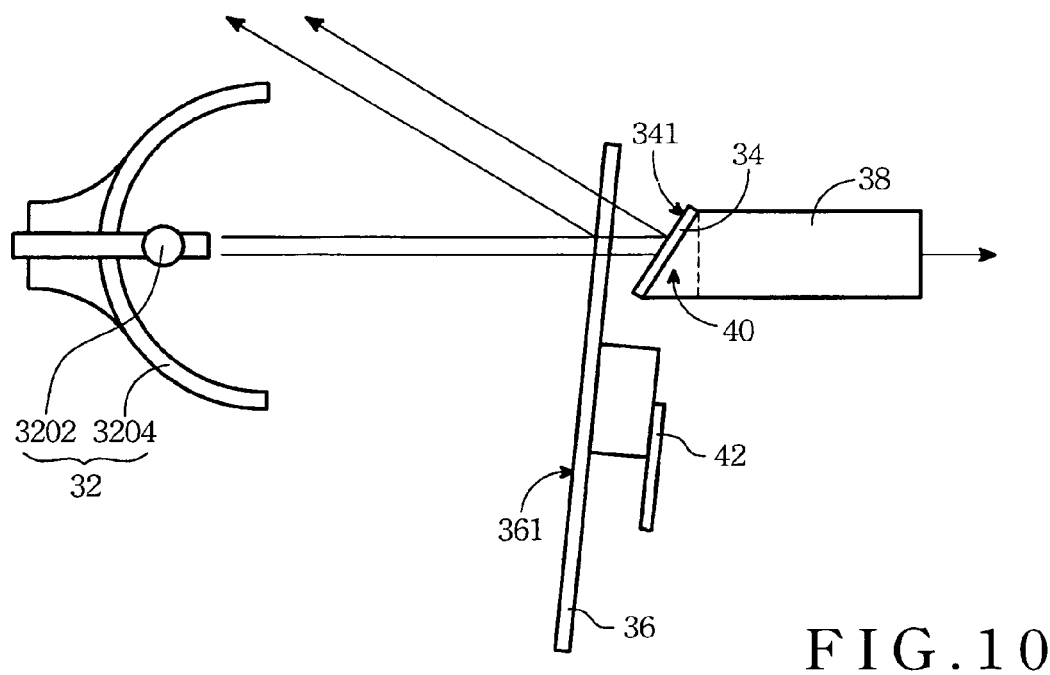
FIG. 10 illustrates a light path of a projector according to the present invention of the eighth embodiment.

Please refer to FIG. 10. In this embodiment, the color wheel 36 is coupled with the tilt structure 42 to form the first tilt surface 361 and disposed adjacent to the light source 32 to directly receive the light beam from the light source 32. The first tilt surface 361 is capable of reflecting the other color light beam toward directions away from the light source 32. The UV/IR filter 34 is not disposed between the color wheel 36 and the light source 32 in this embodiment. The color wheel 36, for example, comprises three kind of filters, such as the red filter, the green filter and the blue filter. Generally, the green filter is capable of filtering out the ultraviolet and the infrared radiation. The red filter is not able to filter out the infrared radiation effectively, and the blue filter is not able to filter out the ultraviolet effectively. Accordingly, the transparent wedge-shaped structure 40 is disposed at the entrance of the integration rod 38 in this embodiment. The UV/IR filter 34 is disposed on the surface of the transparent wedge-shaped structure 40 to reflect the invisible light beam toward directions away from the light source 32.

While adopting a solid integration rod 38, the transparent wedge-shaped structure 40 is integrally formed with the integration rod 38. In other words, the transparent wedge-shaped structure 40 is a part of the integration rod 38 having a trapezoid cross section view. When adopting a hollow integration rod 38, the transparent wedge-shaped structure 40 is manufacturing separately and disposed at an end of the integration rod 38 adjacent to the color wheel 36.

In the present invention, tilting the color wheel 36, disposing the transparent wedge-shaped structure 40, or tilting the UV/IR filter 34 is capable of guiding an amount of the light beam reflected from UV/IR filter 34 or/and the color wheel 36 away from the light source 32. Obviously, the high temperature problem of the conventional projector is resolved according to the present invention.

With the example, and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A projector, comprising:
a light source for providing a light beam;
a color wheel for receiving the light beam, a primary color light beam of the light beam passing through the color wheel in a predetermined time section, and the other color light beam of the light beam reflected by the color wheel; and a transparent wedge-shaped structure disposed between the light source and the color wheel for refracting the other color light beam reflected by the color wheel toward directions away from the light source.

2. The projector according to claim 1, further comprising an integration rod for receiving the primary color light beam.

3. The projector according to claim 1, wherein the light source comprises:
   a lamp for providing the light beam; and
   a lamp reflector for guiding the light beam provided by the lamp to the color wheel.

4. The projector according to claim 1, wherein the means for guiding the light reflected by the color wheel toward directions away from the light source is a tilt structure coupled with the color wheel to form a first tilt surface the color wheel.

5. The projector according to claim 1 further comprising an Ultraviolet/Infrared Radiation(UV/IR) filter disposed on a surface of the transparent wedge-shaped structure near the light source.

6. The projector according to claim 5, wherein the UV/IR filter disposed on the surface of the transparent wedge-shaped structure has second tilt surface for reflecting the ultraviolet and the infrared radiation of the light beam, toward directions away from the light source.

7. The projector according to claim 1 further comprising an Ultraviolet/Infrared Radiation (UV/IR) filter disposed between the light source and the color wheel, the UV/IR filter being transmitting a visible light of the light beam provided by the light source and reflecting the ultraviolet and the infrared radiation, wherein the UV/IR filter is disposed at a tilt angle to have a second tilt surface to reflect the ultraviolet and the infrared radiation of the light beam toward directions away from the light source.

8. The projector according to claim 7, wherein the tilt angle ranges from 13 degrees to 30 degrees.

9. A projector, comprising:
   a light source for providing a light beam;
   an Ultraviolet/Infrared Radiation (UV/IR) filter for receiving the light beam, the UV/IR filter being transmitting a visible light of the light beam and reflecting the ultraviolet and the infrared radiation of the light beam, wherein the UV/IR filter is disposed at a tilt angle,
   wherein the tilt angle ranges from 13 degrees to 30 degrees to reflect the ultraviolet and the infrared radiation of the light beam toward directions away from the light source;
   a color wheel, for receiving the visible light of the light beam, transmitting a primary color light beam of the visible light of the light beam in a predetermined time section, and reflecting the other color light beam of the visible light of the light beam; and
   a transparent wedge-shaped structure, disposed between the light source and the color wheel for refracting the other color light beam reflected by the color wheel toward directions away from the light source.

10. The projector according to claim 9, further comprising a tilt structure coupled with the color wheel to form a first tilt surface of the color wheel for guiding the other color light beam reflected by the color wheel toward directions away from the light source.

11. The projector according to claim 9, wherein the UV/IR filter is disposed on a surface of the transparent wedge-shaped structure near the light source.

12. The projector according to claim 9 further comprising an integration rod for receiving the primary color light beam.

13. The projector according to claim 9, wherein the light source comprises:
   a lamp for providing the light beam; and
   a lamp reflector for guiding the light beam provided by the lamp to the UV/IR filter.

14. The projector according to claim 9 further comprising an integration rod, the UV/IR filter is disposed at an entrance of the integration rod.

* * * * *